United States Patent [19]

Young

[11] Patent Number: 4,700,972
[45] Date of Patent: Oct. 20, 1987

[54] COMPUTERIZED, CENTRAL HYDRAULIC, ELECTRONIC VARIABLE SUSPENSION

[76] Inventor: Colin G. Young, 1368 Glen Rutley Circle, Mississauga, Canada, L4X 1Z6

[21] Appl. No.: 873,987

[22] Filed: Jun. 13, 1986

[30] Foreign Application Priority Data

Jun. 20, 1985 [AU] Australia .............................. PH1115

[51] Int. Cl.$^4$ ...................... B60G 17/00; B62D 17/00
[52] U.S. Cl. .................................... 280/707; 280/661
[58] Field of Search ......... 280/661, 707, 709, DIG. 1, 280/6 H, 6 R; 188/299

[56] References Cited

U.S. PATENT DOCUMENTS

| | | | |
|---|---|---|---|
| 3,608,925 | 9/1971 | Murphy | 280/707 |
| 4,310,173 | 1/1982 | Varady | 280/704 |
| 4,364,574 | 12/1982 | Saito | 280/707 |
| 4,371,191 | 2/1983 | Goldberg | 280/661 |
| 4,506,751 | 3/1985 | Stephens | 280/707 |

FOREIGN PATENT DOCUMENTS 2161891  1/1986  United Kingdom ............... 280/6 R Primary Examiner—David M. Mitchell
Assistant Examiner—Karin L. Ferriter
Attorney, Agent, or Firm—Riches, McKenzie & Herbert

[57] ABSTRACT

A vehicle suspension system using sensors and a computing means to vary suspension and road-handling parameters such as wheel camber, suspension spring rates, suspension damping coefficients, vehicle leveling and clearance to provide a vehicle with optimum suspension characteristics. This system is useful particularly, but not necessarily, for racing vehicles.

5 Claims, 8 Drawing Figures

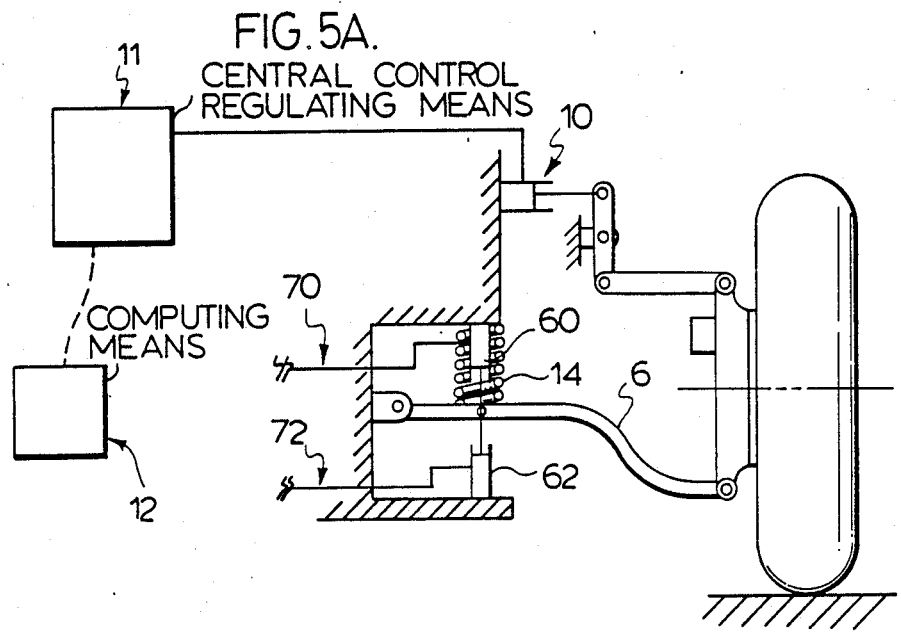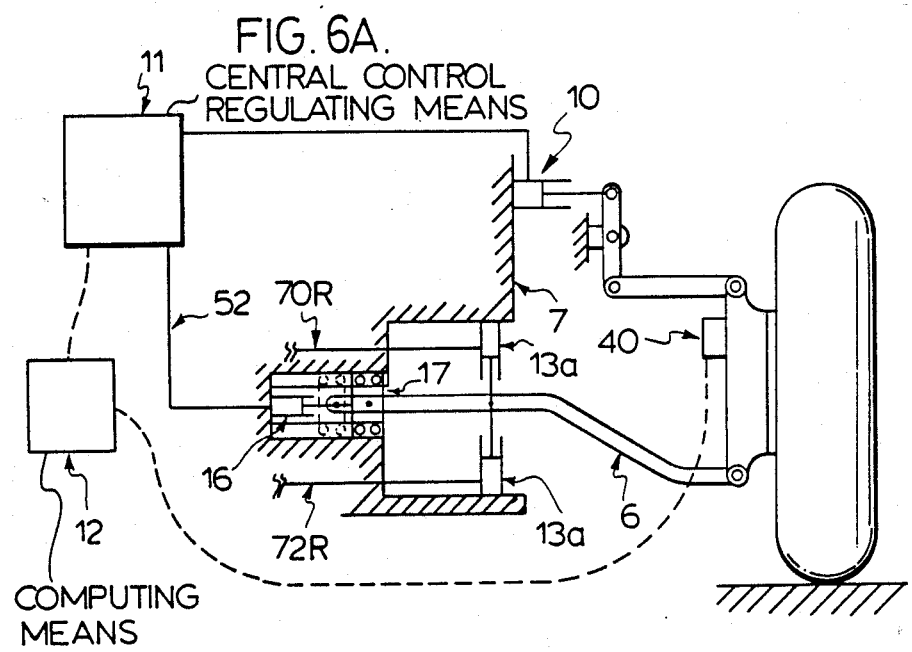

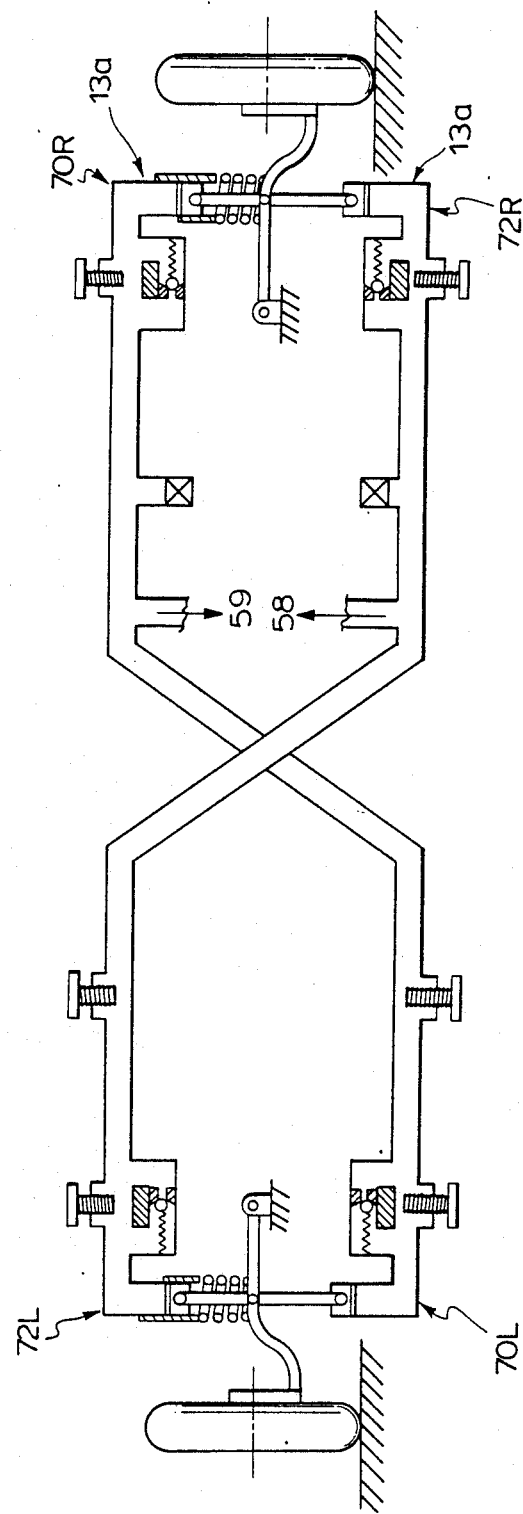

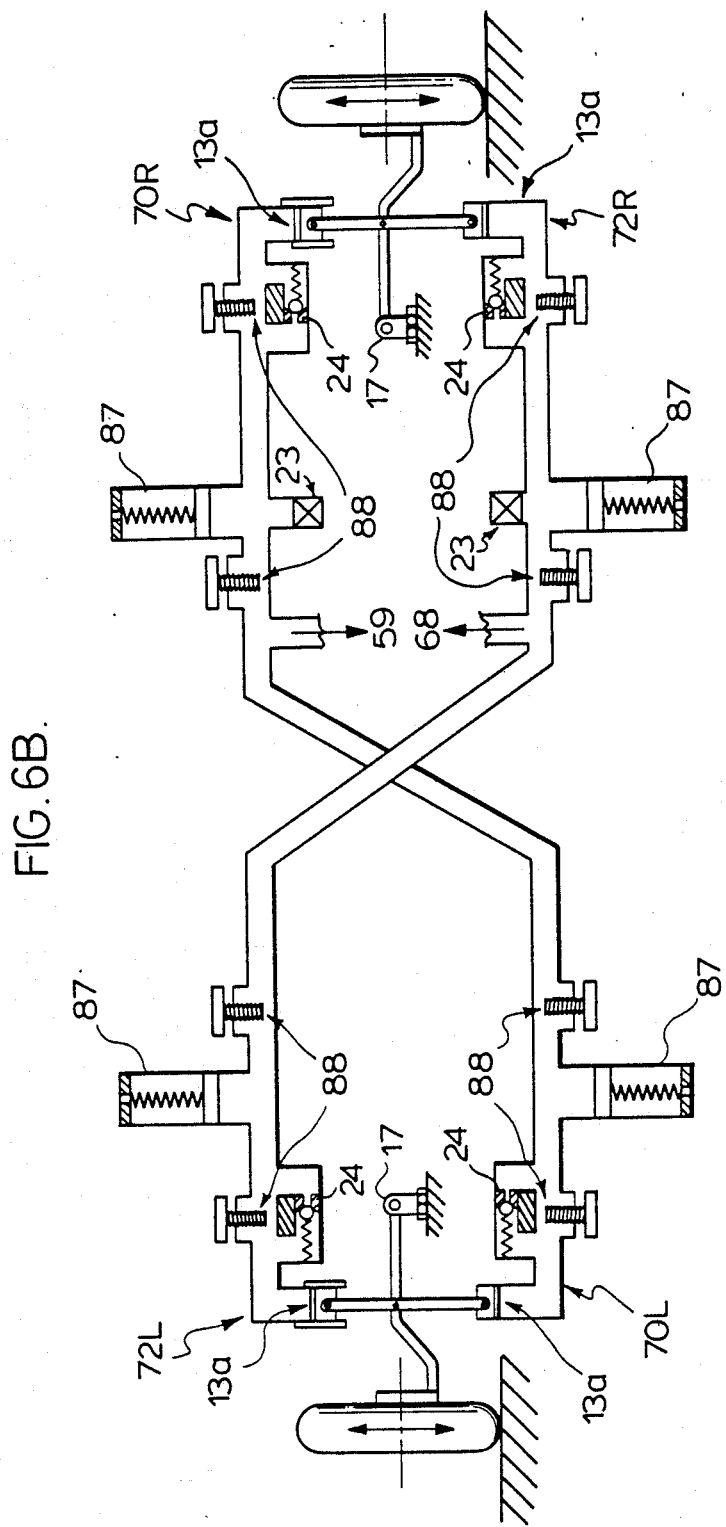

COMPUTERIZED, CENTRAL HYDRAULIC, ELECTRONIC VARIABLE SUSPENSION

BACKGROUND OF THE INVENTION

This invention relates to vehicle suspension systems, and in particular to racing cars, where it endeavors to continually provide the maximum possible cornering force by each tire.

In order to develop the maximum cornering force, each tire must obtain the maximum traction by obtaining the maximum tire-to-road contact area, and by having the maximum tire-to-road contact time and loading.

In the past, many attempts have been made to achieve a superior suspension system. There have been many designs of suspension layouts and geometries, aimed at obtaining the desired tire inclination or camber for each and every road and vehicle condition, in an effort to obtain the greatest contact area, allowing for tire distortion which occurs during cornering.

Also, there have been many designs of springing and damping systems that attempt to minimize the wheel bounce or vertical displacement, in an effort to achieve firm and continuous tire-to-road contact.

On a race track, there can be differences in camber, surface smoothness and adhesion between the various corners, and conditions can change significantly during a race due to surface damage, rubber and oil accumulation, and other causes. During a race, drivers may have to use different lanes through corners, in order to avoid other race cars, where the parameters affecting the vehicle handling are different. Also, during a race, the handling characteristics of a vehicle will change as the fuel load changes, when new tires are fitted, and if wear or damage to the tires or suspension occurs.

Clearly, a "fixed" suspension system, that is, one that does not compensate for all the variants, cannot possibly achieve the optimum road-holding, hence maximum cornering force.

SUMMARY OF THE INVENTION

The invention resides in providing a system that continually and automatically compensates for the aforementioned variants, so that it instantaneously controls each tire camber to achieve the greatest possible contact area, and regulates the springing, damping and stiffness of each wheel so as to obtain the maximum possible tire-to-road contact time and loading.

Accordingly, in one of its broad aspects, the invention resides in a vehicle having a wheels wherein each wheel has a variable camber, a suspension system comprising: a plurality of lateral-acceleration-sensing means determining and providing lateral-acceleration input relating to lateral acceleration of the vehicle, a plurality of camber-sensing means, each corresponding to a particular wheel and determining and providing camber input relating to the chamber of the particular wheel; a plurality of camber-control means, each corresponding to a particular wheel and controlling the camber of the particular wheel; a computing means which receives the input from the lateral-acceleration-sensing means and from each of the camber-sensing means, processes the inputs corresponding to at least one selected wheel, and provides a camber-output to the camber-control means for controlling the camber of the at least one selected wheel.

Accordingly, in one of its further broad aspects, the invention resides in a vehicle having a plurality of wheels, a suspension system comprising: a plurality of body-roll-sensing means, each corresponding to a particular wheel and determining and providing body-roll input relating to lateral body-roll of the vehicle in a region proximate the particular wheel; a plurality of vertical-control means, each corresponding to a particular wheel and controlling a vertical position of the particular wheel with respect to a chassis; a computing means receives the input from each of the body-roll-sensing means, processes the inputs corresponding to at least one selected wheel, and provides a vertical-output to the vertical-control means for controlling the vertical position of the at least one selected wheel.

BRIEF DESCRIPTION OF THE DRAWINGS

The nature of the invention, and the best manner of carrying it out will be more clearly understood from the following description thereof with reference to the accompanying drawings, in which:

FIG. 5A represents a schematic view of another embodiment of the invention wherein a combined anti-roll and damping system is provided;

FIG. 5B represents a schematic diagram of a hydraulic circuit for the anti-roll and damping system of FIG. 5A;

FIG. 6A represents a schematic view of another embodiment of the invention wherein a combined anti-roll and damping system is provided in combination with the tire control mechanism; and FIG. 6B represents a schematic diagram of a hydraulic circuit for the particular embodiment shown in FIG. 6A.

DETAILED DESCRIPTION OF THE INVENTION AND PREFERRED EMBODIMENT THEREOF

Figure 1:
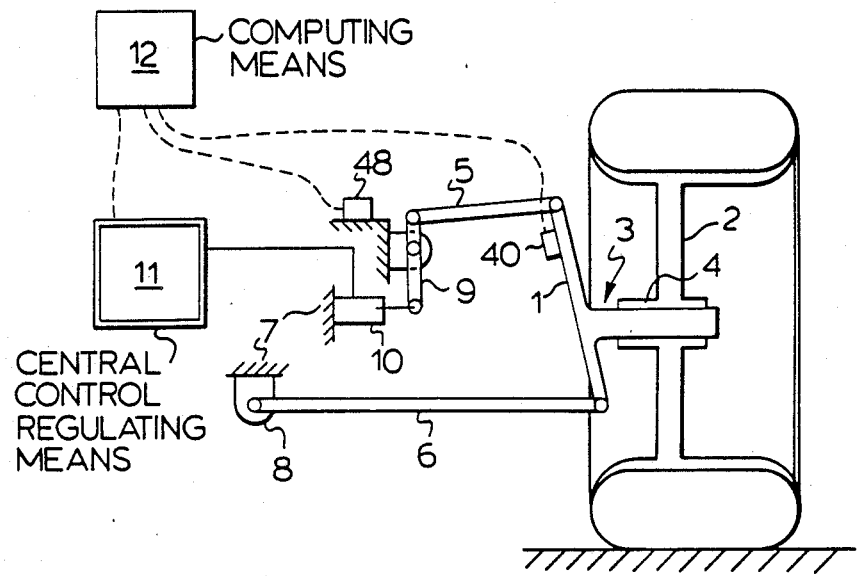
FIG. 1 represents a schematic view of a vehicle suspension system for one wheel, wherein a mechanism is provided for changing the camber of a wheel.

As can be seen from FIG. 1, an independent suspension assembly normally comprises a king-pin, or upright 1 which supports the wheel 2 by means of an axle 3 and bearing 4, hinged to an upper lateral control arm, or wish-bone 5, and to a lower lateral control arm, or wish-bone 6, the inner ends of the control arms are hinged to the chassis, or body, of the vehicle 7, typically by means of spherical bearings 8.

In an embodiment of the invention which is shown in FIG. 1, the inner end of the upper control arm 5 is hinged to a lever, the fulcrum of which is hinged to the vehicle structure. Another part of the lever is connected to a camber control unit 10, such that movement of the piston of the camber control unit 10 causes the upper control arm to move laterally, causing a change in the camber of the wheel.

An alternative embodiment (not shown) uses a conventional layout, but has one, or both, camber control arms as a telescopic unit, such that movement of the camber control unit 10, which is incorporated in the control arm 5 or 6, changes the distance between the inner and outer bearings, thus changing the wheel camber.

Figure 2:
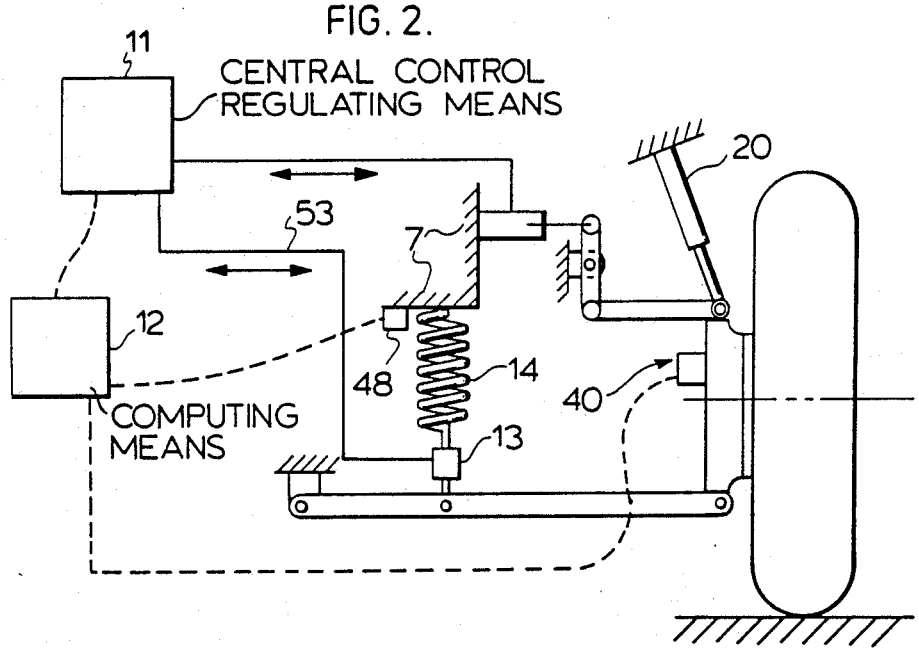
FIG. 2 represents a schematic view of another embodiment of the invention, in which there is additionally provided a vertical control means.

Typically, as shown in FIGS. 1 and 2, the camber control unit 10 is a hydraulic cylinder and piston assembly. It may be, however, an electric motor and associated gears which produce a linear displacement when connected to control arms 5 or 6. Generally, however, the camber control unit is operated by the central control regulating means 11 which controls the working fluid supplied to various piston and cylinder assemblies. A computing means 12 incorporated into said central control regulating means 11, or operating as a separate unit and interfacing with the central control regulating means, as shown in FIGS. 1 to 4, receives signals from laterally mounted accelerometers 48 and camber indicators 40 mounted on each kingpin or upright 1. From these signals the computing means 12 calculates the amount of change in the wheel camber that is required for each vehicle wheel so as to maximize the amount of tire-to-road contact regardless of vehicle body roll, wheel bounce, or other undesirable conditions.

The desired wheel camber angles for each wheel at a given cornering force or acceleration are stored in the memory of the computing means 12, and are pre-determined using such means as a test track, for example. Provision is thus made in the computing means for memory circuits capable of storing pre-set values of tire camber angle for each tire at given values of lateral cornering acceleration for the front and/or rear ends of the vehicle. During vehicle operation, the computing means 12 continually sends signals to the central control regulating means 11 to cause the camber control units 10 to adjust wheel camber to the pre-determined value of wheel camber for that individual wheel, at the particular measured instantaneous lateral cornering acceleration of the front and/or rear ends of the vehicle.

Provision may also be made for further circuitry within the computing means to allow re-adjustment of each of the pre-stored values of tire camber angle at each of the associated lateral acceleration values, during vehicle operation. This feature would allow the computing means to self-adjust for changing conditions, such as a different vehicle weight, to achieve optimum tire camber at the new condition.

To accomplish self-adjustment, the computing means 12 would make a slight incremental adjustment, either an increase or decrease in each of the tire camber angles at the front and/or rear of the vehicle. During a given period, for example the period necessary to complete one circuit of a race track during a race, the computing means for each sensed value of lateral acceleration would continually adjust the front and/or rear tire camber to the pre-stored value of tire camber plus or minus the incremental adjustment. In addition, during such given period, the computing means would measure and store in its memory the maximum measured lateral acceleration of the front and/or rear of the vehicle. If this maximum value attainable was higher than any of the pre-existing stored values, the computing means would adjust each of the pre-stored values of camber by the incremental amount, and store these values in the memory. These values then become the pre-stored values.

If the maximum attainable values for lateral acceleration were lower than the pre-stored values, the computer would not make any adjustment to the pre-stored values, but rather would retain such values in its memory. The computing means 12 would then make for the next given period an incremental adjustment of the tire camber of the front and/or rear tires opposite to that which was made previously and then repeat the above process. For example, if an increase had been made to the tire camber, and the maximum attainable lateral acceleration during the given period was lower than the maximum pre-stored value, the computing means would retain the pre-stored value, and for the next given period, make an incremental adjustment resulting in a decrease in the tire camber of the front and/or rear tires.

Provision may be made to allow separate adjustment of the front wheels separate from the rear wheels. For example, the computing means to maximize lateral attainable acceleration of the vehicle may find it necessary to make incremental adjustment to increase the pre-stored values of camber angle on the front tires, while making incremental adjustment to decrease tire camber on the rear wheels.

In this fashion the vehicle suspension system can continually provide the optimum wheel camber angle for both the front and rear of the vehicle, which therefore provides maximum tire-to-road contact and hence maximum cornering acceleration despite changing vehicle characteristics such as vehicle weight distribution.

In one embodiment of this invention, the wheel camber sensing means 40 may utilize a gyroscope as a reference for determining the camber angle of each wheel. In another embodiment the wheel camber sensing means 40 may be configured so as to measure changes in reference dimensions between datum points on wheel suspension components as a means of determining wheel camber angle.

An important feature of the invention is its ability to allow the driver to adjust the vehicle handling characteristics, so that the amount of under-steer or over-steer at various cornering accelerations can be controlled. While normally it is desirable to obtain the maximum cornering force at each tire, it may be necessary at times to reduce the cornering force at either the front or rear tires in order to achieve the desired vehicle control.

Depending on the preferred tire wear pattern, the computing means 12 can be programmed or manually adjusted to increase or decrease the cambers on either the front or rear tires from the normal-maximum-force settings so that the cornering force at that particular end of the vehicle is reduced.

As a further refinement of the above feature, provision may be made for optical sensors to sense each tire temperature across its surface. In response to such measurement, the computing means 12 upon receiving such input may either reduce or increase tire camber on one or more wheels to adjust the temperature profile across the tire closer to a pre-determined condition. Provision may also be for cancelation of inputs resulting from extreme conditions, such as tire skid or vehicle spin.

The invention may utilize conventional springs 14, torson bars, shock absorbers or dampers 20, and antiroll bars as means in which to resiliently suspending the wheels from the vehicle chassis.

Figure 3:
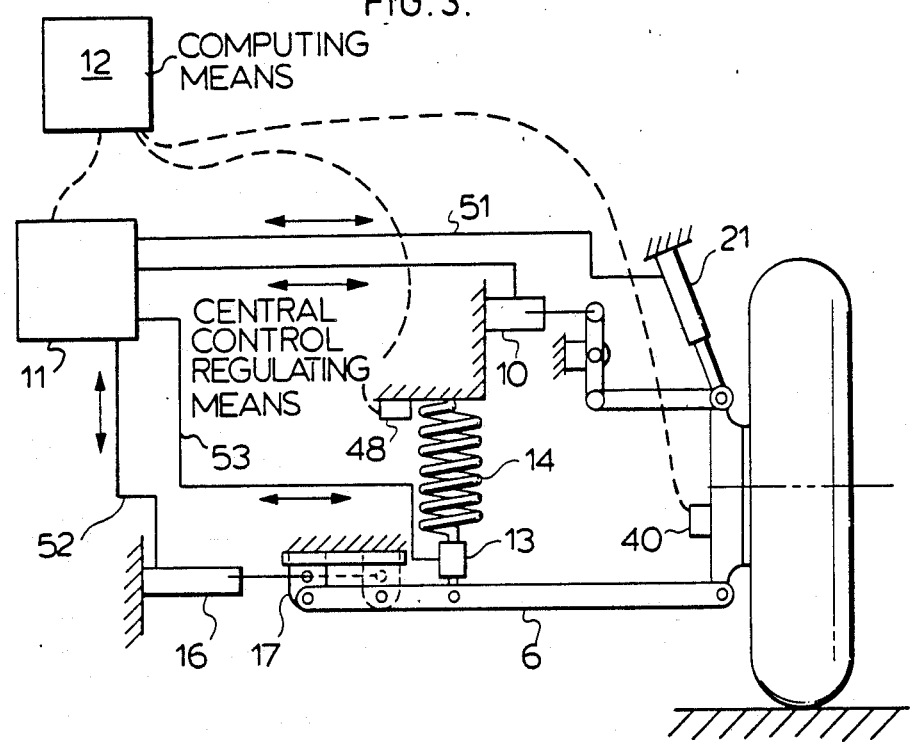
FIG. 3 represents a schematic view of another embodiment of the invention, in which there is additionally provided means for adjusting the spring constant and damping co-efficient of the vehicle suspension system.

As a further refinement of this invention, another embodiment as shown in FIGS. 2 and 3 has added a vertical control unit 13 to each wheel suspension system. Each vertical control unit 13 is comprised of a piston and cylinder which has pressurized working fluid supplied to it by the central control regulating means 11. The purpose of such vertical control units 13 is to provide a vehicle leveling and clearance device to both level the vehicle body despite unequal weight distribution on each wheel, and to also adjust the vehicle chassis clearance above the road surface. By means of sensors 48 described later in more detail, the computing means 12 can cause the central control regulating means 11 to adjust the vertical control units 13 to reduce lateral and longitudinal roll of the vehicle, and thereby increase the maximum attainable cornering acceleration of the vehicle.

Figure 4:
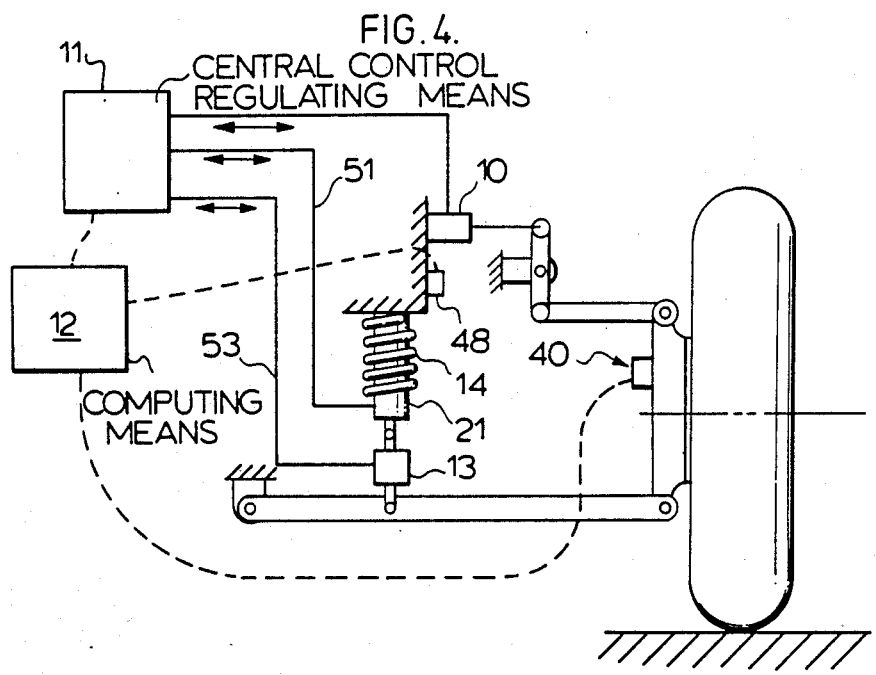
FIG. 4 represents a schematic view of another embodiment of the invention in which an alternate position for the damping means is shown.

The invention provides for vertical control units 13 to be affixed to a conventional vehicle suspension means, such as a coil spring 14, leaf spring, torson spring, or pneumatic diaphragm and chamber (not shown) to form an assembly. Each assembly is then affixed to both the vehicle chassis 7 at one end and the suspended wheel or a part affixed thereto, such as the lower lateral control arm 6, at the other. As shown in FIGS. 2, 3 and 4, in order for the central control regulating means 11 to properly adjust the vertical control units 13 for each wheel to its desired height, lateral and longitudinal body roll sensors 48 provide input to the computing means 12. The computing means 12 calculates the amount of adjustment necessary to eliminate body roll, and in turn supplies signals to the central control regulating means 11 which then adjusts the working fluid pressure in pressure lines 53 connected to each vertical control unit 13.

Vertical control units 13a may also be incorporated into a vehicle suspension system as shown in FIGS. 5A and 6A, and used in the hydraulic circuit for the antiroll and damping circuit shown in FIGS. 5B and 6B later described. Each hydraulic circuit for a suspended wheel on one side of the vehicle is interconnected to the corresponding circuit on the opposite side of the vehicle. A central control regulating means 11 interfacing with a computing means 12 may be used to supply pressurized hydraulic fluid to the hydraulic systems shown in FIGS. 5B and 6B to regulate the vehicle clearance. In this fashion hydraulic circuits which incorporate vertical control units 13a, as well as a central control regulating means 11 and a computing means 12 may accomplish the dual purposes of (1) damping and controlling vehicle body roll, and (2) simultaneously controlling the vertical ground clearance of the vehicle at each individual wheel.

Variable loading expansion chambers 87 and orifices 88, such as those shown in FIG. 6A, may be incorporated in each hydraulic circuit to regulate the degree of independence of each wheel suspension unit on each other suspension unit.

A pressurized hydraulic accumulator (not shown) with control valves may be used to regulate the amount of fluid in each hydraulic circuit. Accordingly, the vehicle attitude, or front and rear ground clearances, can be adjusted.

As a further refinement, this invention also provides for means to vary the effective suspension spring constant, as well as means for varying the damping co-efficient of a shock absorbing means. The shock absorbing means may be located within the hydraulic circuit in the form of a variable orifice 88 as shown in FIGS. 5B or 6B, or may be independently regulated units 21, such as shown in FIGS. 3 and 4. By combining a means for adjusting the damping co-efficient of the suspension system, as well as a means for varying the spring constant rate, the dynamic response of each wheel suspension unit may be optimized for the road conditions encountered by each wheel.

FIGS. 3 and 6A as shown are means of varying the effective suspension spring constant rate by means of a conventional coil spring 14, a lower control arm 6, a variable fulcrum 17, and a piston and cylinder 16 regulated by a central control regulating means 11 interfacing a computing means 12. This aspect of the invention is not to be limited to use of a conventional coil spring 14 as the spring suspension means, as other conventional suspension means (not shown) may also be employed, such as a torsional bar suspension with a variable length radius arm. FIGS. 3 and 6A show a particular embodiment of this aspect of the invention, wherein a piston and cylinder 16 is affixed at one end to a movable fulcrum 17, and at the other to the vehicle chassis. The wheel suspending link 6 is attached to the wheel at one end, and at the other is pivoted about the movable fulcrum. The variable fulcrum piston and cylinder 16 is connected by means of pressure lines 52 to a central control regulating means 11. On response to signals received from accelerometers 40 mounted typically on each wheel hub, king pin, or upright and measuring wheel vertical accelerations, the computing means 12 sends signals to the central control regulating means 11, which in turn regulates the working fluid pressure in pressure lines 52 to cause movement of the piston 16 which adjusts the location of the fulcrum of a lower lateral control arm 6, to which a convention spring means 14 is affixed.

In this way the computing means 12 can adjust the position of the variable fulcrum 17 which effectively changes the spring constant of the conventional spring means 14, and effectively optimizes the suspension characteristics for the road conditions encountered.

To adjust the damping co-efficient of the wheel suspension system, the invention further provides in FIG. 3 a shock absorbing device 21 regulated by a central control means 11 which interfaces with a computing means 12. Such regulated shock absorbing device 21 is affixed at one end to the vehicle chassis and at the other to the wheel hub. FIG. 4 shows another configuration for the location of the shock absorbing member or damping unit 21.

In both embodiments shown in FIGS. 3 and 4, the member 21 is connected to means of hydraulic pressure lines 51 to a central control regulating means 11. Fluid movement within these pressure lines 51 to and from each damping unit independently passes through adjustable orifices within the central control regulating means so that its motion in each direction, resulting from wheel bounce and rebound, can be regulated.

FIGS. 2, 3 and 4 contemplate the damping unit 21, vertical control unit 13, and conventional suspension means 14 as being mechanically distinct components. In another embodiment of this invention, as shown in FIGS. 5A and 6A, the above three suspension components may be combined by use of two piston and cylinder units 60 and 62 affixed to lower control arm 6 which is in turn affixed to a suspended wheel.

Moreover, in a further embodiment, as shown in FIG. 6B, such components may be combined in a single hydraulic circuit, and such individual hydraulic circuits may be cross-linked to give anti-roll capabilities in addition to damping control.

FIGS. 5B and 6B show a left side (L) and a right side (R) of a pair of wheel suspension members mounted on the front or rear of a vehicle. It is possible to have an identical circuit for both the front and rear of the vehicle, and cross-link such circuits so as to further increase anti-roll capabilities of the suspension if desired. Such cross-linking would occur at corresponding junctions 58 and 59 of the front and rear hydraulic circuits, as shown in FIGS. 5B and 6B.

FIG. 6A and the corresponding hydraulic circuit of FIG. 6B make use of a variable expansion chamber 87. In another embodiment, such as shown in FIG. 5A and the corresponding hydraulic circuit of 5B, a conventional spring means 14 may be used to replace the variable expansion chamber 87 as the vehicle suspension means.

While only shown in FIGS. 6A and 6B, it is contemplated that both of the embodiments shown in FIGS. 5A and 5B and FIGS. 6A and 6B may incorporate a variable fulcrum 17 operated by a central control regulating means 11 and computing means 12 to vary the effective spring constant of each wheel suspension system.

In a preferred embodiment as shown in FIG. 3, or the configuration of FIGS. 6A and 6B wherein provision is made for a central control regulating unit 11 to adjust the variable fulcrum position 17 and orifice diameters 88, two methods may be used to adjust the spring constant and damping co-efficient of each wheel to obtain optimum dynamic response of each wheel for given road conditions, thereby minimizing vehicle chassis movement and as a result increasing the tire-road contact.

The first method provides for additional vertical accelerometers 50 mounted on the vehicle chassis in proximity to each wheel. The computer means 12 then causes the variable fulcrum position 17 and damping co-efficient of damping means 21 or 88 to be adjusted to result in minimum output from the accelerometers 50 mounted on the vehicle body, thereby minimizing vehicle chassis motion.

In an alternative configuration, vertical accelerometers 40 mounted on each wheel are used to provide a forced vibrational input signal as a function of time for each wheel to computing means 12 which uses pre-programmed equations to determine the vehicle chassis movement. These pre-programmed equations describe the optimum conventional spring constants (in terms of variable fulcrum position 17) and optimum damping co-efficients (in terms of variable orifice sizes in the central control regulating unit, or in the hydraulic circuit itself — reference 88 of FIGS. 5B and 6B) each as a function of forced vibrational input. Computing means 12 for each forced vibrational input selects the optimum fulcrum position 17 and variable orifice diameter, and sends the appropriate signal to the central control regulating unit so that both the fulcrum position 17 and amount of damping through the orifices may be adjusted accordingly. FIG. 6B shows only manually operated damping orifice adjustments 88. However it is recognized a central control regulating means 11 may also be provided, in addition to a computing means 12, to adjust the orifices by servo or electromechanical means.

In like manner for the provision of computing means 12 having self-adjusting memory capability for camber control, in preferred embodiment self-adjusting memory capability is also provided in the computing means 12 for adjusting the spring constants and the damping co-efficients contained in the pre-programmed equations. The computing means 12 is programed to systematically make slight variation in the signal sent to the central control regulating means 11, which then correspondingly makes slight adjustments in the position of the fulcrum 17 and the variable orifice diameters. As a next step, the computing means determines whether the output from sensors 48 (which determine the amount of lateral body roll and longitudinal body roll) has diminished, and if so, maintains the modified signal being sent to the central control regulating unit.

Provision also made for the computing means 12 to store in the memory the magnitude of the amended signal for a given vibrational input from the vertical accelerometers 40, similar to the self-adjusting procedure used for camber control.

In a further aspect of this invention, transmission means may be provided to transmit values for data stored in the memory of the computing means 12 as well as for transmitting values of the sensors to a location remote from the vehicle, so that the data may be analyzed.

As an added feature of this invention, a safety feature is contemplated whereby the central control regulating unit 11, or the hydraulic circuit of FIGS. 5B or 6B, are provided with an ability to quickly dump working fluid contained in pressure lines 51, 53 or 70L, 72L and 72R into a reservoir (not shown), so that all suspension systems "collapse". The vehicle chassis underside is further provided with an undercoating of a durable adhesive material, whereupon the collapse of the suspension system results in said chassis underside contacting the road surface to allow faster stopping in emergency conditions.

The central hydraulic unit 11 and/or the adjustable orifices 88 of the hydraulic circuit shown in FIGS. 5B and 6B would normally be accessable to the driver, so that adjustments to the wheel loadings, dampenings and stiffnesses could be made while the vehicle is in motion.

A prime feature of the invention is its ability to automatically and continually control all adjustments of the suspension system, so as to provide the optimum settings that achieve the maximum possible tire-to-road contact time and loading, hence the maximum possible cornering force and cornering speed.

In another embodiment, the operator of the vehicle can manually adjust the various parameters that control the camber and suspension. The operator would observe the data received from the various sensors and then manually adjust the various control parameters in accordance with the discretion of the operator.

Although specific embodiments of the invention have been described, it will be understood by persons skilled in the art that functionally equivalent variations are intended to fall within the scope of the invention.

What I claim is:

1. For use in a vehicle having a plurality of wheels, wherein each wheel has a variable camber, a suspension system comprising;

a lateral-acceleration-sensing means determining and providing lateral-acceleration input relating to lateral-acceleration of the vehicle;

a plurality of camber-sensing means, each corresponding to a particular wheel and determining and providing camber input relating to the camber of the particular wheel;

a plurality of camber-control means, each corresponding to a particular wheel and controlling the camber of the particular wheel;

a computing means which receives the input from the lateral-acceleration-sensing means from each of the camber-sensing means, processes the inputs corresponding to at least one selected wheel, and provides a camber output to the camber-control means for controlling the camber of the at least one selected wheel; a plurality of body-roll-sensing means, each corresponding to a particular wheel and determining and providing body-roll input relating to lateral body-roll of the vehicle in a region proximate the particular wheel;

a plurality of vertical-control means, each corresponding to a particular wheel and controlling a vertical distance between the particular wheel and a chassis;

wherein the computing means receives the input from each of the body-roll-sensing means, processes the inputs corresponding to at least one selected wheel, and provides a vertical-output to the vertical-control means for controlling the vertical position of the at least one selected wheel;

a plurality of vertical-acceleration-sensing means, each corresponding to a particular wheel and determining and providing vertical-acceleration input relating to vertical-acceleration of the vehicle in the region proximate the particular wheel;

a plurality of variable positioned fulcrums, each coresponding to a particular wheel and connected to the chassis by a piston and cylinder, and wherein varying a position of the variable-positioned fulcrum varies an effective spring rate constant of the vehicle corresponding to the particular wheel;

a plurality of positioning means, each corresponding to a particular wheel and for varying the position of the variable-positioned fulcrum;

the computing means receiving and processing the vertical-acceleration inputs, and computing a forced vibrational input over time for at least one selected wheel; and the computer means providing a fulcrum-output to the positioning means corresponding to the selected wheel to vary the position of the variable-positioned fulcrum.

2. A system as defined in claim 1 wherein the computing means has a memory means and stored in the memory means are, for each selected wheel:

a previous lateral-acceleration input from the corresponding lateral-acceleration-sensing means; and a previous camber input from the corresponding camber-sensing means, wherein the camber of the selected wheel is firstly incrementally altered in a positive or a negative direction, with respect to the previous camber input;

the computing means compares for each selected wheel the lateral-acceleration input to the previous lateral-acceleration input; and if the lateral-acceleration input is greater than or equal to the previous lateral-acceleration input, the lateral-acceleration input is stored in the memory as the previous lateral-acceleration input and the computing means provides the camber-output to cause the control means to incrementally alter the camber of the selected wheel in the same direction as firstly altered; and if the lateral-acceleration input is less than the previous lateral-acceleration input, the computing means provides the camber-output to cause the control means to incrementally alter the camber of the selected wheel in a direction opposite to the direction as firstly altered.

3. A system as defined in claim 1 wherein, stored in the memory means is, for each selected wheel:

a previous body-roll input from the corresponding body-roll-sensing means;

wherein the position of the variable-positioned fulcrum corresponding to the selected wheel of each selected wheel is firstly incrementally varied in a positive or negative direction;

the computing means compares for each selected wheel the body-roll input to the previous body-roll input; and if the body-roll input is lesser than or equal to the previous body-roll input, the body-roll input is stored in the memory as the previous body-roll input and the computing means provides a fulcrum-output to cause the positioning means to incrementally vary the position of the variable-positioned fulcrum corresponding to the selected wheel in the same direction as firstly varied; and if the body-roll input is greater than the previous body-roll input, the computing means provides a fulcrum-output to cause the positioning means to incrementally vary the position of the variable positioned fulcrum corresponding to the selected wheel in a direction opposite to the direction as firstly varied.

4. For use in a vehicle having a plurality of wheels, a suspension system comprising:

a plurality of body-roll-sensing means, each corresponding to a particular wheel and determining and providing body-roll input relating to lateral body-roll of the vehicle in a region proximate the particular wheel;

a plurality of vertical-control means, each corresponding to a particular wheel and controlling a vertical distance between the particular wheel and a chassis;

a computing means which receives the input from each of the body-roll-sensing means, processes the inputs corresponding to at least one selected wheel, and provides a vertical-output to the vertical-control means for controlling the vertical position of the at least one selected wheel;

a plurality of vertical-acceleration-sensing means, each corresponding to a particular wheel and determining and providing vertical-acceleration input relating to vertical-acceleration of the vehicle in the region proximate the particular wheel;

a plurality of variable positioned fulcrums, each corresponding to a particular wheel and connected to the chassis by a piston and cylinder, and wherein varying a position of the variable-positioned fulcrum varies an effective spring rate constant of the vehicle corresponding to the particular wheel;

a plurality of positioning means, each corresponding to a particular wheel and for varying the position of the variable-positioned fulcrum;

the computing means receiving and processing the vertical-acceleration inputs, and computing a forced vibrational input over time for at least one selected wheel; and the computer means providing a fulcrum-output to the positioning means corresponding to the selected wheel to vary the position of the variable-positioned fulcrum.

5. A system as defined in claim 4 wherein, stored in the memory means is, for each selected wheel:
- a previous body-roll input from the corresponding body-roll-sensing means;
- wherein the position of the variable-positioned fulcrum corresponding to the selected wheel of each selected wheel is firstly incrementally varied in a positive or negative direction;
- the computing means compares for each selected wheel the body-roll input to the previous body-roll input; and
- if the body-roll input is lesser than or equal to the previous body-roll input, the body-roll input is stored in the memory as the previous body-roll input and the computing means provides a fulcrum-output to cause the positioning means to incrementally vary the position of the variable-positioned fulcrum corresponding to the selected wheel in the same direction as firstly varied; and
- if the body-roll input is greater than the previous body-roll input, the computing means provides a fulcrum-output to cause the positioning means to incrementally vary the position of the variable positioned fulcrum corresponding to the selected wheel in a direction opposite to the direction as firstly varied.

* * * * *